United States Patent [19]
Rouf et al.

[11] 3,829,167
[45] Aug. 13, 1974

[54] AUTOMATIC DECELERATION CONTROL SYSTEM

[75] Inventors: Edgar J. Rouf, Akron; Harold R. Booher, Youngstown, both of Ohio

[73] Assignee: The Goodyear Tire & Rubber Company, Akron, Ohio

[22] Filed: Nov. 21, 1972

[21] Appl. No.: 308,512

[52] U.S. Cl.......... 303/21 CG, 188/181 A, 244/111
[51] Int. Cl.............................................. B60t 8/12
[58] Field of Search................ 188/181 A; 244/111; 303/20, 21; 324/162; 340/53, 262

[56] References Cited
UNITED STATES PATENTS

| | | | |
|---|---|---|---|
| 3,401,984 | 9/1968 | Williams et al. | 303/21 BE |
| 3,520,575 | 7/1970 | Steigerwald | 244/111 X |
| 3,537,758 | 11/1970 | Buhler et al. | 303/21 BE X |
| 3,545,817 | 12/1970 | Yarber | 303/21 P |
| 3,608,979 | 9/1971 | Coyle | 303/21 EB |
| 3,614,174 | 10/1971 | Romero | 303/21 CG |
| 3,682,512 | 8/1972 | Malon et al. | 303/20 |
| 3,711,163 | 1/1973 | Booher | 244/111 X |

*Primary Examiner*—Trygve M. Blix
*Assistant Examiner*—Stephen G. Kunin
*Attorney, Agent, or Firm*—Oldham & Oldham

[57] ABSTRACT

Disclosed is a unique automatic deceleration control system of such a nature that it may be instantaneously interrupted by anti-skid control circuitry when adverse conditions exist and instantaneously restored to operation when such adverse conditions cease. A comparator circuit emits an output indicative of the comparison between the actual deceleration of the vehicle and a preselected desired rate of deceleration. An RC circuit receives the output of the comparator and forms ramp functions therefrom so as to achieve steady rates of application and release of brake pressure. Associated with the RC circuit is clock and initialization circuitry. The clock circuit inhibits the discharge of the capacitor of the RC circuit when adverse braking conditions exist and the initialization circuit inhibits the affect of the clock circuit when the brakes are initially placed under the control of the automatic deceleration control circuit. Also connected to the RC circuit is a current driving amplifier to provide the necessary power for controlling the brake valves of the vehicle in accordance with the output of the RC circuit.

17 Claims, 5 Drawing Figures

3,829,167

AUTOMATIC DECELERATION CONTROL SYSTEM

Heretofore in the field of Brake Control Systems a plurality of means have become known whereby the automatic braking of vehicles movable upon rotating wheels might be achieved. Known systems have generally taught the utilization of wheel speed transducers associated with each wheel or set of wheels on the vehicle whereby signals indicative of the instantaneous velocity of the various wheels might be developed. These electrical signals in turn control the circuitry associated with the various wheels or sets of wheels so as to control the braking thereof. An inherent drawback in such systems has been that the provision of independent braking circuitry for each wheel or set of wheels often times results in one such wheel or set of wheels handling the bulk of the braking for the entire vehicle. This situation often times arises when the various circuits associated with the wheels or set of wheels are not tuned or adjusted so as to maintain the same rates of deceleration. For example, if one particular circuit were adjusted to maintain a deceleration of 10 ft/sec$^2$ and another such circuit, due to a slight variation in resistor values, were characterized so as to maintain a deceleration rate of 11 ft/sec$^2$ then it can be seen that the latter circuit, and the wheels associated therewith, would be forced to handle the bulk of the braking of the vehicle while the former circuit, seldom seeing a deceleration rate less than 10 ft/sec$^2$ due to the braking efforts of the latter circuit, would do little braking.

It has further been known that brake control systems might be developed wherein anti-skid circuitry may be incorporated so as to allow a maximum braking force to be applied to the brakes of the vehicle while preventing skidding situations from arising. These systems generally allow the vehicle operator to control the application and release of the brakes such that the rate of deceleration of the vehicle is totally within the control of the operator. The anti-skid control circuitry is available so as to prevent the occurrence of a skidding situation. Such systems, being controlled by a human operator, are subject to error and misjudgements. Although such systems are certainly safer than those totally within the control of the operator and not having anti-skid control circuitry, it would still appear to be most desirable to have a totally automatic deceleration control circuit operating in conjunction with an anti-skid control circuit so as to achieve a predetermined rate of deceleration while guaranteeing that skidding situations will not arise.

It is therefore the general object of the instant invention to present an automatic deceleration control system smoothly operating in conjunction with anti-skid control circuitry such that a preselected rate of deceleration of a movable vehicle may be achieved without any need of performance by the vehicle operator.

A further object of the invention is to provide an automatic deceleration control system which may be instantaneously interrupted by anti-skid control circuitry when adverse conditions so demand and instantaneously restored to operation when such adverse conditions cease.

Still a further object of the invention is to provide an automatic deceleration control system which operates under the control of signals indicative of the deceleration of the vehicle as a whole and which controls the deceleration of the vehicle by means of the application of equal forces to each of the brakes associated with the various wheels of the vehicle.

These objects and other objects which will become apparent as the description proceeds are achieved by circuitry which comprises: a linear decelerometer sensing the deceleration of the vehicle as a whole and creating an electrical signal relative thereto; a scaling and buffing amplifier receiving the electrical signal from the linear decelerometer and amplifying the electrical signal to a predetermined proportionate amplitude; a comparator circuit receiving the amplified electrical signal, comparing that signal with a preselected electrical signal which is indicative of the desired rate of deceleration, and creating an output signal corresponding to the results of the comparison; an integrator circuit receiving the output of the comparator circuit and integrating that output with respect to time; a current amplifier receiving the integrated signal and causing that signal to effect the various brake valves of the vehicle; a clock circuit which serves to inhibit the operation of the integrator circuit when certain predetermined conditions are existent; and initialization circuitry operative to selectively inhibit the effect of the clock circuit upon the integrator circuit.

For a better understanding of the invention reference should be made to the accompanying drawing wherein.

Figure 1:
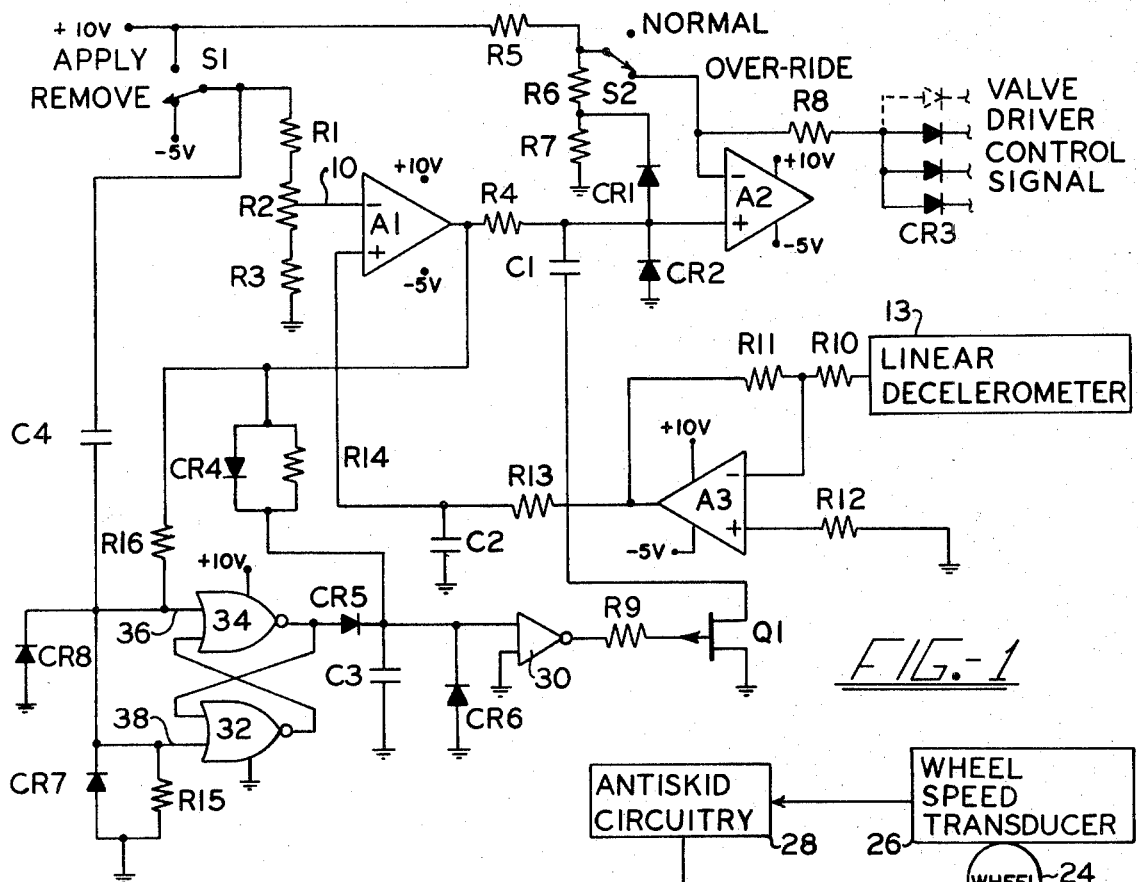
FIG. 1 is a schematic circuit diagram of the automatic deceleration control circuit.

Referring now to the drawings and more particularly FIG. 1, an understanding of the operation of the instant invention may be achieved. Fundamentally, the apparatus of the invention operates by comparing an electrical signal indicative of the actual vehicle deceleration with a preselected electrical value which is indicative of the desired rate of deceleration. The result of the comparison is in turn used to control the application and release of brake pressure to the brakes associated with the wheels of the vehicle. The regulation of brake control is achieved by a continuous process of like comparisons such that a constant desirable rate of deceleration may be achieved.

Particularly, it can be seen from FIG. 1 that the preselected voltage indicative of the desirable rate of vehicle deceleration is achieved by means of the voltage divider comprising resistors R1 and R3 and potentiometer R2. By adjustment of the wiper arm 10 of the potentiometer R2 the vehicle operator may preselect any desirable rate of deceleration within a range determined by the values of R1, R2, and R3. With the potentiometer R2 so adjusted, the switch S1 may be placed into the apply position and the switch S2 into the normal position. If the instant invention is to be utilized in an aircraft braking system then it would be well understood by those skilled in the art that the switching of S1 and S2 might be readily achieved upon touchdown by means of a squat switch. It is to be further understood that in the preferred application of the invention the switches S1 and S2 would be logic gating networks providing the means of applying the system only after certain predetermined conditions have been satisfied.

With S1 and S2 so positioned, it can be seen that there is instantaneously applied to the negative input of the comparator A1 a voltage determined by the characteristics of the voltage divider comprising R1, R2 and R3, which is indicative of the desired rate of deceleration to be maintained. Incident to the positive input of the compartor A1 is the voltage signal indicative of the actual rate of deceleration of the vehicle. This signal may be produced by any of numerous suitable means but would most preferably be derived from a linear decelerometer 13, the output of which is an electrical indicia of the rate of deceleration of the vehicle as a whole. The output of the linear decelerometer 13 is applied to the scaling and buffering amplifier comprising A3, R10, R11, and R12. Such amplifiers are well known and understood in the art. The output of the amplifier A3 is then passed through the filter network comprising C2 and R13 so as to guarantee a clean signal to the comparator A1.

The output of the comparator A1 is determined by the relationship between the voltages incident to the positive and negative inputs thereof. In the preferred embodiment of the invention if the desired deceleration indicated at the negative input is greater than the actual deceleration evidenced at the positive input then the output of comparator A1 will be approximately −3.5 volts and if the actual deceleration is greater than the desired deceleration the output of the comparator A1 will be approximately +9 volts.

In order to provide for a smooth manner of application and release of brake pressure in the system the RC ramping or integrating circuit comprising the resistor R4 and the capacitor C1 has been provided at the output of the comparator A1. When the output of the comparator A1 goes to +9 volts then the capacitor C1 will begin to charge at a rate dependent upon the time constant determined by the selected value of R4 and the capacitor C1. Similarly, when the output of comparator A1 goes to −3.5 volts then the capacitor C1 will begin to discharge at a rate commensurate with the time constant. As is well understood by those skilled in the art, these charge and discharge rates will appear to be nearly linear ramp functions as long as the charge or discharge time is less than 1 RC time constant, and will serve to provide the gradual application and release of brake pressure in the system.

The actual application of the electrical control signals to the valves associated with the brakes of the vehicle is achieved by means of the voltage follower, A2. This stage, as is understood by those skilled in the art, has a unity voltage gain but provides the signal necessary to control the several valve current drivers associated with the system. The voltage output of the amplifier A2 is identical to the voltage incident to the positive input of the amplifier. The characteristics of the input voltage are, as described hereinabove, dependent upon the outputs of the comparator A1 and the RC time constant as determined by resistor R4 and capacitor C1. The maximum and minimum values of the voltage incident to the positive input of the amplifier A2 are controlled by the diodes CR1 and CR2. As can be seen from the circuit, the minimum value of the voltage which may be incident to the positive input of the amplifier A2 would be one "diodedrop" below ground whereas the maximum value which this voltage might have would be one diode-drop above the value determined by the voltage divider comprising resistors R5, R6, and R7. These maximum and minimum voltage values would correspond to full release of brake pressure and full application of brake pressure respectively. The degree of fluctuation of the voltage incident to the positive input of the amplifier A1 would of course determine the degree of application or release of brake pressure between these maximum and minimum values.

Provisions have been made in the instant invention whereby automatic braking of the vehicle by means of the automatic deceleration control system may be released and returned to the manual control of the vehicle operator. As shown in FIG. 1, switch S2 provides a means for applying an overriding voltage to the negative input of the amplifier A2. This overriding voltage is, due to the voltage divider comprising resistors R5, R6, and R7, of a greater amplitude than that which can be incident to the positive input of the amplifier. Consequently, with switch S2 in the override position the effects of the automatic deceleration control system upon the brake valves of the vehicle are negated. However, the automatic decleration control circuit continues to function and produce signals incident to the positive input of amplifier A2 which are indicative of the desired degree of brake pressure application such that when switch S2 is placed into the normal position the automatic deceleration control system may instantaneously take over the braking of the vehicle. It can be seen then that the provision of the voltage divider network comprising R5, R6, and R7, which is tapped at various points so as to control the voltages incident to the positive and negative inputs of the amplifier A2, provides a means whereby the vehicle operator may rapidly acquire personal control of the braking of the vehicle or release such control to the preselected control methods of the automatic deceleration control circuit.

The output of the amplifier A2 is applied to the valve drivers which control the valves associated with the brakes of the vehicle so as to achieve uniform application and release of brake pressure. The utilization of electrical signals to control such valves is of course well understood by those skilled in the art. In general then it can be seen that each of the valves of the vehicle will receive a signal identical to that received by the other valves. Consequently, a uniformity of braking among the various wheels on the vehicle will be realized.

provisions have been made whereby anti-skid control circuitry may be individually associated with each of the wheels of the vehicle so as to provide anti-skid protection in the system while achieving a uniform method of brake application. As can be seen from FIG. 1, the output of amplifier A2 would have a fan-out equivalent to the number of valves to be controlled in the system. Also associated with each of the valves in the system would be an anti-skid control circuit similar in nature to those disclosed in Letters Patent 3,520,575 and 3,582,151. As is well understood by those skilled in the art, such anti-skid control circuits seek to prevent a rotating wheel from going into a skidding condition by constantly sensing a voltage indicative of the instantaneous wheel velocity and using that voltage to control the application and release of brake pressure. Upon sensing a locked wheel or skidding condition, such circuits cause the release of brake pressure and the gradual reapplication of such pressure so as to achieve a braking of the wheel without experiencing a skid. It is of course most desirable that any vehicular braking system comprise not only an automatic deceleration control means but also anti-skid control circuitry. The instant invention has been designed so as to be readily adaptable for use in braking systems utilizing anti-skid control circuitry now well known in the art.

Figure 2:
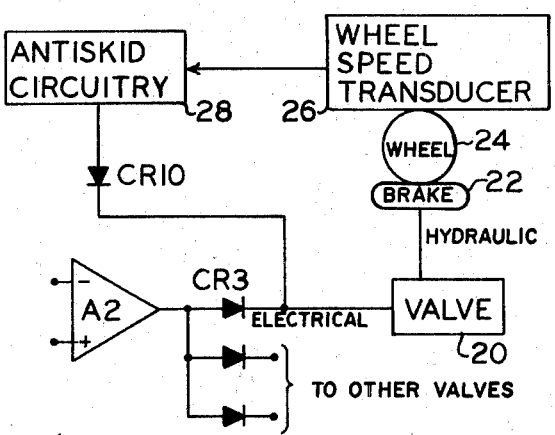
FIG. 2 illustrates the preferred interrelationship of the automatic deceleration control circuit with anti-skid circuitry.

As can be seen from FIG. 1, the braking signal output of amplifier A2 is applied to each of the brake valves on the vehicle through the respective diodes CR3, and the valve drivers. These diodes serve to isolate each of the respective valve drivers and valves of the system from each other in the event of anti-skid action. FIG. 2 illustrates the actual application of the braking signal from the amplifier A2 to the valve associated with one of the wheels or sets of wheels of the vehicle. As can be seen from FIG. 2, the valve 20 may be controlled by either of two electrical signals; that from the amplifier A2 or that from the anti-skid circuitry 28. Under normal conditions there will be no control signal from the anti-skid circuitry 28 to affect the valve 20 and consequently the entire control of the valve 20 will be achieved by means of the output of the amplifier A2. However, if one of the wheels 24 should begin to skid due to adverse conditions of the surface upon which the wheel is rotating or for any other reason then the wheel speed transducer 26 will indicate such a condition to the anti-skid circuitry 28 which in turn will cause a signal to pass through the diode CR10 and to the valve 20. Since, as indicated hereinabove, the amount of pressure applied through the valve is inversely proportional to the magnitude of the electrical signal incident thereto, it can be seen that the output signal from the anti-skid circuit 28 will override the signal produced by the amplifier A2 and thus cause a release of brake pressure for that individual wheel 24. The diodes CR3 of course provide for an isolation of each of the individual wheels such that the anti-skid circuitry 28 associated with any particular wheel will not affect the circuitry associated with any of the other wheels. It can be seen then that the instant invention has been designed such that under normal operating conditions brake pressure will be applied to and released from each of the brakes of the vehicle in unison with the application and release of all other brakes. If however a problem should exist in one of the wheels or sets of wheels of the vehicle then that problem will be isolated and handled individually and, after the problem is alleviated, control will be smoothly returned to the automatic deceleration control circuit.

Figure 3A:
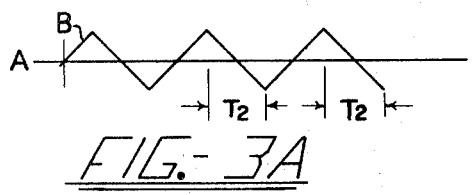
FIG. 3A illustrates the manner in which the actual brake control signal searches about the ideal brake control signal level.

It should now be understood that the wave form of the signal incident to the positive input of the amplfier A2 will be substantially a triangular signal B searching about an optimum brake apply signal level A as indicated in FIG. 3A. The positive ramps of the signal B control the gradual release of brake pressure while the negative ramps of the signal B control the gradual application of brake pressure. Such application and release of brake pressure is maintained until the vehicle is brought to a stop.

Figure 3B:
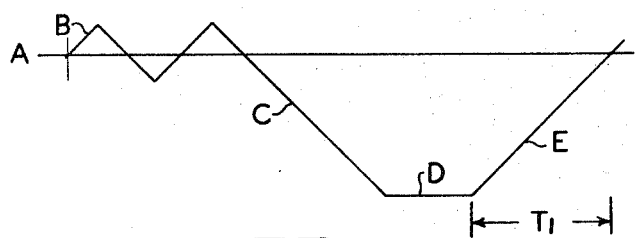
FIG. 3B illustrates the decay of the brake control signal in a skidding situation.

If the instant invention were to be utilized in the braking system of an aircraft then it should be understood that a particular problem might be encountered when the aircraft attempts to brake on an icy runway. In such a situation the linear decelerometer 13 would indicate to the comparator A1 that the aircraft has not achieved the desired rate of deceleration. Consequently, the output of the comparator A1 would go to its low state and the capacitor C1 would begin to discharge through the resistor R4. The output of the amplifier A2 would correspondingly decrease causing more and more brake pressure to be applied to the various wheels. Eventually, the wheels would begin to skid and a situation would arise such that the individual anti-skid circuits associated with the various wheels or sets of wheels would begin to control the application and release of brake pressure. However, the linear decelerometer 13 would continue to indicate to the comparator A1 that the aircraft has not achieved the desired rate of deceleration. Consequently, the capacitor C1 would continue to discharge through the resistor R4 due to the low level incident at the output of the comparator A1. This discharge is illustrated by Section C of the voltage signal B illustrated in FIG. 3B. It should become apparent that a critical situation would exist when the aircraft again reaches dry runway. While the aircraft was skidding on the icy runway the capacitor C1 was totally or substantially discharged to the level D through the resistor R4. It is imperative that when the aircraft again reaches dry runway the automatic deceleration circuit is capable of immediately regaining control of the braking of the aircraft. If the output of the comparator A1 had been at a low state for a time sufficient to allow the capacitor C1 to discharge to the level D then, upon reaching dry runway, a critical time delay T1 would be experienced while the capacitor C1 is recharged according to the ramp function E. During this time period an abnormally high level of brake pressure would be applied, due to the low charge level of C1, causing abnormally high deceleration and perhaps additional skidding.

Figure 3C:
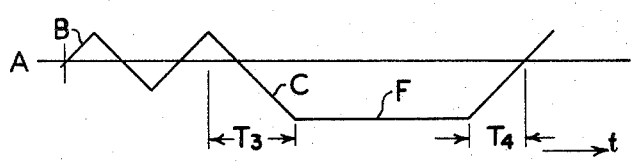
FIG. 3C illustrates the attenuated decay of the brake control signal in a skidding situation by means of the unique circuitry of the invention.

Provisions have been made in the instant invention to alleviate the critical time delay problem just described. A clock circuit comprising resistor R14, capacitor C3, diode CR4, and inverter 30 is connected to the output of the amplifier A1. When the output of the amplifier A1 goes to its high state the capacitor C3 is immediately charged to this value through the diode CR4. When the output of the amplifier A1 goes to the low state then the capacitor C3 discharges through the resistor R14 at a rate dependent upon the RC time constant. When the capacitor C3 discharges below the switching threshold of the inverter 30, the output of the inverter 30 goes to a high state gating the field effect transistor Q1 off. With Q1 gated off the capacitor C1 is prevented from any further discharging since the negative side thereof has now been removed from ground. Consequently, since the characteristics of the signal B as shown in FIG. 3A are readily known the resistor R14 may be selected such that the clock circuit will time out and prevent the capacitor C1 from further discharge when the output of A1 stays in the low state for an abnormal length of time. Since the timing circuit is reset each time the output of A2 goes to the high state, the clock circuit may be set so as to time out at a period of time slightly greater than T2, the normal period of time that the output of A1 would be in a low state. This situation is clearly shown in FIG. 3C. Here it may be seen that the resistor R14 may be selected so as to discharge to the switching threshold of the inverter 30 after a period of time T3, such time being slightly greater than time T2. When the output of the amplifier A1 has been in a low state for a period of time T3 the capacitor C3 has sufficiently discharged through the resistor R14 to cause the output of the inverter 30 to go to its high state thus gating the field effect transistor Q1 off and preventing further discharge of the capacitor C1. Hence, in a skidding situation, the capacitor C1 will be allowed to discharge only to the level F of FIG. 3C as compared to the level D in FIG. 3B and consequently the automatic deceleration control system may regain control of the braking of the vehicle in a time T4 as compared to the time T1 and avoids the abnormally high level of deceleration that would otherwise occur during the period after anti-skid activity ceases. Of course, it is to be understood in regards to the timing circuitry that a comparator similar to A1 might be used in place of the inverter 30 so as to provide a particular point at which the discharge of capacitor C1 is inhibited, and the solid state element Q1 need not be a field effect transistor but would be any of numerous solid state gating devices.

The initialization circuitry is a latch circuit comprised of NOR gates 32 and 34, diodes CR5, CR7, and CR8, resistors R15 and R16, and capacitor C4. It is utilized to prevent interference from the timing circuit when the automatic braking system is initially applied. When switch S1 is placed in the apply position the output of the comparator A1 goes to its low state causing a logic zero to be placed on input 36 of the NOR gate 34. Coincident with the switching of S1, a positive pulse is coupled through C4 which momentarily causes a logic 1 to be placed at input 38 of NOR gate 32. Consequently, the output of NOR gate 32 goes to a logic zero such that both inputs to NOR gate 34 are logic zeros causing the output thereof to go to a logic 1 and thus setting the latch. Hence capacitor C3 is initially charged to a high state approximately equal to the high level output of the compartor A1. This situation guarantees that the output of the inverter 30 will be held at its low state while the brakes are intially being applied. When the vehicle first exceeds the desired rate of deceleration then the output of the comparator A1 goes to a logic 1 which in turn causes the output of NOR gate 34 to go to a logic zero, resetting the latch comprising NOR gates 32 and 34, such that the initialization circuit will no longer affect the operation of the automatic deceleration control circuit. Hence, once the vehicle first exceeds the desired rate of deceleration the output of the amplifier A2 will stabilize and gradually fluctuate above and below the ideal braking voltage under the safeguards of the clock circuit.

A unique provision of the instant invention is that the switches S1 and S2, as described hereinabove, may be logic switches, the gating of which is dependent upon the existence of predetermined conditions. It is further contemplated that switches S1 and S2 will be activated by means of commonly known travel switches affectuated by the brake pedal of the vehicle. It is contemplated that switch S1 will be associated with a 10 percent travel switch while switch S2 will be activated by a 60 percent travel switch. If the pilot depresses the brake pedal 10 percent of its travel distance then switch S1 would be placed into the remove position such that the output of the comparator A1 would go to the high state so that brake pressure would be gradually removed and the aircraft would go into a taxiing situation. If the pilot depresses the brake pedal 60 percent or more of the travel distance then switch S2 would go to the override position and the output of the amplifier A2 would go to a state providing for the immediate and complete removal of the automatic braking signal such that immediate manual control of the braking of the vehicle might be achieved by the pilot.

It should now be apparent that a particularly unique attribute of the apparatus of the instant invention is that it is readily adaptable to systems presently utilizing anti-skid circuitry. As can be seen in FIG. 2, the automatic deceleration control circuit may be added to a braking system already utilizing anti-skid circuitry without requiring the augmentation of that circuitry. Particularly, the instant invention provides a completely compatible add-on system for presently existing DC-10 anti-skid/braking systems. Consequently, aircraft presently utilizing the DC-10 system would be capable of adding the instant invention thereto without adversely affecting any of the presently existing anti-skid equipment.

Thus it can be seen that the objects of the invention have been achieved by the apparatus disclosed herein. While in accordance with the patent statutes only the best known and preferred embodiment of the invention has been presented, it is to be understood that the invention is not limited thereto or thereby. Similarly, the particular values associated with the components in the drawings and specification are for illustrative purposes only and any of numerous combinations and values of components will achieve the teachings of this invention. Therefore, in ascertaining the true scope of this invention reference should be made to the appended claims.

What is claimed is:

1. Circuitry for automatically controlling the deceleration of a moving vehicle having valve actuated brakes comprising:
    a first circuit means sensing the rate of vehicular deceleration and creating a first electrical signal proportionately related thereto;
    a second circuit means receiving the first electrical signal, comparing the first electrical signal with a preselected second electrical signal which is indicative of the desired rate of deceleration, and creating a third electrical signal indicative of the degree of comparison;
    a third circuit means to receive and shape the third electrical signal so as to create a fourth electrical signal;
    a fourth circuit means receiving the fourth electrical signal and controlling the application and release of brake pressure in conformance with the shape of the fourth electrical signal, the fourth circuit means providing the necessary current drive to actuate the vehicle brake valves; and
    a clock circuit connected to the third circuit means and limiting the value of the fourth electrical signal as the same relates to the release of brake pressure.

2. The circuit according to claim 1 wherein the first circuit means comprises a linear decelerometer which feeds into a scaling and buffering amplifier.

3. The circuit according to claim 2 wherein the second circuit means comprises a comparator circuit, the preselected second electrical signal is a D.C. level created by a voltage divider, and the third electrical signal is a bi-state signal, the state of which is indicative of the relative values of the first electrical signal and the D.C. level.

4. The circuit according to claim 3 wherein the third circuit means comprises a resistor series connected with a capacitor such that the switching of the bi-state third electrical signal is caused to form positive and negative ramp voltage functions.

5. The circuit according to claim 4 wherein the fourth electrial circuit is a current amplifier having unity voltage gain.

6. The circuit according to claim 1 which further includes an initialization circuit which interrelates with the clock circuit so as to inhibit the functioning of the clock circuit during the period of the first release of brake pressure.

7. The apparatus according to claim 1 which further includes anti-skid control circuitry associated with the valve actuated brakes such that the control of the braking of the vehicle by the anti-skid control circuitry and the control of the braking by the circuitry for automatically controlling deceleration are mutually exclusive.

8. The apparatus according to claim 1 which further includes means for the smooth release of control of the circuitry for automatically controlling deceleration so as to provide a gradual total release of brake pressure.

9. The apparatus according to claim 1 which further includes means for the instantaneous release of control of the circuitry for automatically controlling declaration so as to provide an instantaneous release of all brake pressure.

10. Circuitry providing the automatic control of the deceleration of a moving vehicle having valve actuated brakes which comprises:
- a linear decelerometer sensing the deceleration of the vehicle as a whole and creating an electrical signal relative thereto;
- a scaling and buffering amplifier receiving the electrical signal from the linear decelerometer and amplifying the electrical signal to a predetermined proportionate amplitude;
- a comparator circuit reueiving the amplified electrical signal, comparing that original with a preselected electrical signal which is indicative of the desired rate of deceleration, and creating an output signal corresponding to the results of the comparison;
- an integrator circuit receiving the output of the comparator circuit and integrating that output with respect to time;
- a clock circuit connected to the integrator circuit for inhibiting the operation of the integrator circuit when certain predetermined conditions are existent; and
- a current amplifier receiving the integrated signal and causing that signal to affect the various brake valves of the vehicle.

11. The circuitry of claim 10 wherein the preselected electrical signal is created by means of a voltage divider network which utilizes a potentiometer for varying the preselected electrical signal.

12. The circuitry of claim 10 wherein the clock circuit comprises a resistive-capacitive timing circuit feeding a comparator circuit the output of which controls a solid state switching element.

13. The circuitry of claim 10 which further includes initialization circuitry operative to selectively inhibit the effect of the clock circuit upon the integrator circuit.

14. The circuitry of claim 13 wherein the initialization circuitry comprises a latch circuit.

15. The circuitry of claim 10 which includes at least one anti-skid control circuit associated with the vehicle brake valves, the anti-skid control circuits being mutually independent of each other and interacting with the current amplifier in such a manner as to be capable, in predetermined instances, of overriding the effect of the current amplifier upon the brake valves with which the anti-skid control circuits are associated.

16. The circuitry of claim 10 which includes means of gradually releasing the application of brake pressure by biasing the comparator circuit.

17. The circuitry of claim 10 which includes means of instantaneously releasing and applying the integrated signal from the current amplifier to the brake valves such that when the integrated signal is released the circuitry continues to function in response to signals from the linear decelerometer.

* * * * *

PO-1050
(5/69)

UNITED STATES PATENT OFFICE
CERTIFICATE OF CORRECTION

Patent No. 3,829,167   Dated August 13, 1974

Inventor(s) Edgar J Ruof, Harold R Booher

It is certified that error appears in the above-identified patent and that said Letters Patent are hereby corrected as shown below:

Under [75] the name "Rouf" should read -- Ruof --.

Column 4, line 11, "A1" should read --A2--.

Signed and sealed this 26th day of November 1974.

(SEAL)
Attest:

McCOY M. GIBSON JR.
Attesting Officer

C. MARSHALL DANN
Commissioner of Patents